UNITED STATES PATENT OFFICE.

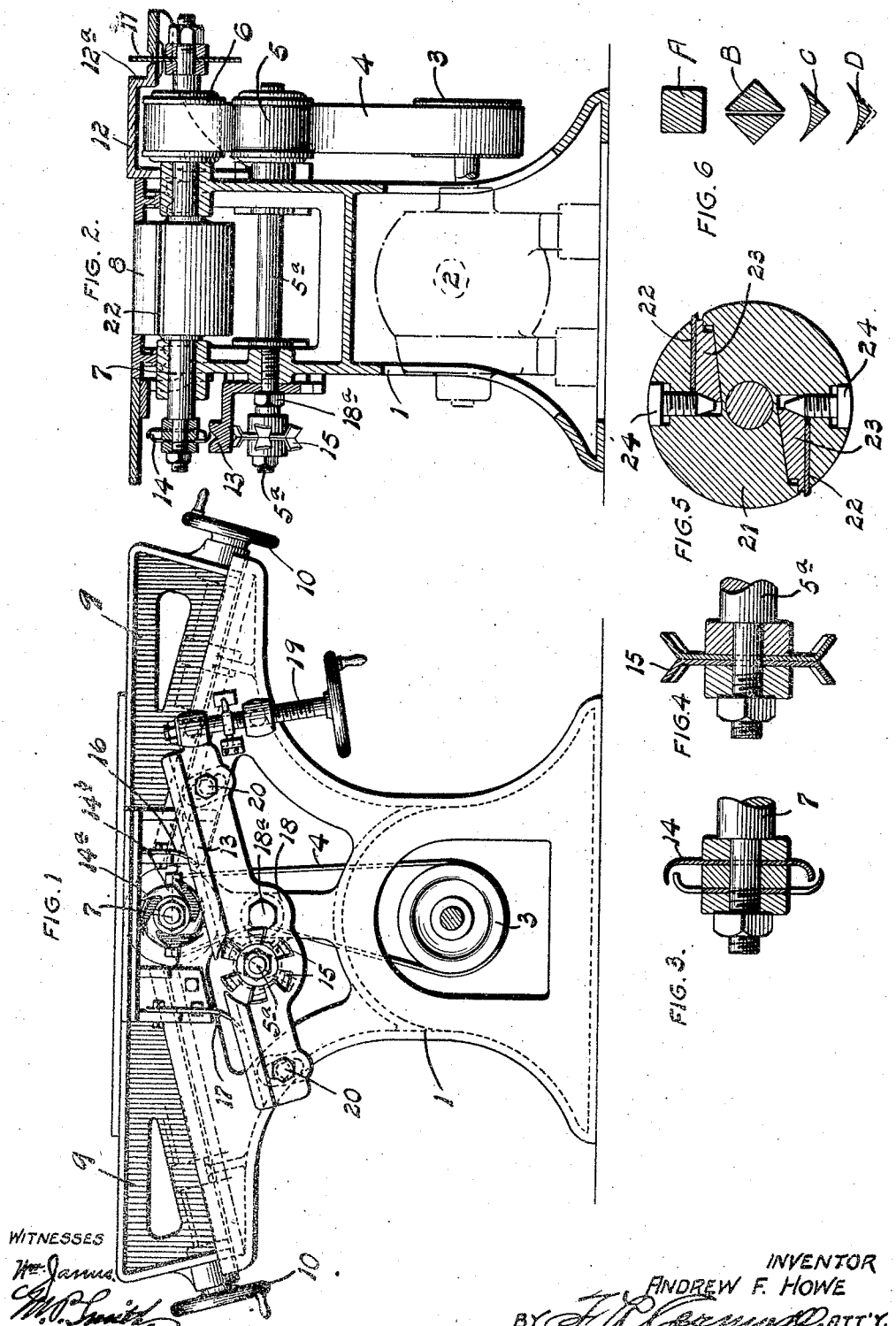

ANDREW F. HOWE, OF GRANITE CITY, ILLINOIS, ASSIGNOR TO COMMONWEALTH STEEL COMPANY, OF ST. LOUIS, MISSOURI, A CORPORATION OF NEW JERSEY.

FILLET-MAKING MACHINE.

1,027,131.           Specification of Letters Patent.           Patented May 21, 1912.

Application filed June 5, 1911. Serial No. 631,380.

*To all whom it may concern:*

Be it known that I, ANDREW F. HOWE, a citizen of the United States, residing at Granite City, Illinois, have invented a certain new and useful Improvement in Fillet-Making Machines, of which the following is a full, clear, and exact description, such as will enable others skilled in the art to which it appertains to make and use the same, reference being had to the accompanying drawings, forming part of this specification, in which—

Figure 1 is a side elevational view of my improved fillet making machine. Fig. 2 is a vertical sectional view through the same. Fig. 3 is a detailed sectional view of one of the fillet cutting heads. Fig. 4 is a detailed view of the other fillet cutting head. Fig. 5 is a detailed view of the planer cutting head. Fig. 6 are conventional illustrations of the different cuts made in producing a fillet.

This invention relates to a new and useful improvement in fillet-making machines, the object being to construct a machine of the character described which will be simple and cheap and which will enable the consumption of scrap lumber in the production of finished fillets.

My improved fillet making machine is combined with a "joiner" as it is called, which is a planer cutting head mounted under adjustable tables and a circular saw, both of which are useful for other purposes than fillet making-machines which are generally employed in a pattern and other wood working shops.

In the drawings: 1 indicates the casing constituting a frame in the lower part of which is an electric motor 2, a pulley 3 on whose armature shaft drives a belt 4 passing around a pulley 5 and over a pulley 6. Pulley 6 is mounted upon a shaft 7 upon which is a planer cutting head 8. On each side of this head 8 are tables 9 mounted upon inclined ways vertically and longitudinally adjustable by means of hand wheels 10 coöperating with threaded rods connected to move said tables in the manner well known. On the shaft 7 is also a circular saw 11 which operates through the bottom of the V-shaped groove or angle, whose faces are approximately 90 degrees to each other, so as to serve as a guide in diagonally bisecting the strips in the production of fillets. This saw 11 may also be used for other purposes, such as producing the rectangular strips A shown in Fig. 6 when it is desired to make fillets. The saw 11 coöperates with a shoulder 12$^a$ mounted on a bracket casing 12 bolted to the framing 1 and preferably vertically adjustable for well understood purposes. When the rectangular fillet strips A are made, they may be planed on the cutter head after which they are diagonally bisected to form the triangular strips B. These triangular strips are arranged in a V-shaped trough 13 and fed by hand to a cutter head 14 mounted on the shaft 7. This cutter head is preferably made by stamping two plates from sheet metal so as to produce separate cutting blades whose cutting edges 14$^a$ are radially at a greater distance from the axis of rotation than the heels 14$^b$ of said cutter blades. There are two of these dished cutter plates oppositely arranged on the shaft 7 and being spaced apart by washers, as shown in Fig. 3 and clamped against the shoulder of said shaft by means of a clamping bolt shown. The baldes of these plates are preferably staggered with relation to each other and are slightly overlapped in their cutting paths, so as to form the concave faces of the fillet. When the strip B is fed to the concave cutter, the fillet is formed as shown at C, Fig. 6, after which the lower angular back of the fillet passes over cutting blades 15 mounted on the end of the shaft 5$^a$ upon which the pulley 5 is mounted. These cutting blades 15 coöperate with washers and a clamping nut as shown in Fig. 4 and are designed to increase the angle at the back of the fillet, as shown at D, Fig. 6. The purpose of this is to provide a clearance at the joint where the fillet is used, so that when the strip is placed in position in a corner of a pattern, it may be seated properly without the interference from glue or rough edges possibly left in such corners.

To hold the strip B in position as it is fed to the cutter 14, I provide a flat spring 16 whose pressure is exerted upon the flat upper face of the fillet, while a spring 17 preferably with a curved lower edge to fit in the concave face of the fillet is provided on the opposite side of the cutter 14 to hold the fillet in a trough as it leaves the cutter 14. The trough 13 is interrupted in its length so that the cutter 15 can properly operate upon the back or lower inclined faces of the fillet, said trough being formed integral with a bracket 18 pivoted at 18ª and whose angular position is adjusted by means of the hand screw 19. Bolts 20 operate in the slots in the side frame which may be screwed up to clamp the trough 13 in its adjusted positions. By adjusting the trough 13, fillets of different sizes may be made. In desiring to maintain the relation of the trough to the cutter 15, it is obvious that the trough 13 could be pivoted upon the shaft 5ª, but I have found in practice that the range of adjustment of the trough for different standard sizes of fillets is so small that the changed relation between the trough and the cutter 15 will not materially affect the operation of the said cutter upon the back of the fillet.

In Fig. 5 I have shown a planer cutting head of approved form for use in connection with my improved machine in which 21 indicates the body of the cutter head formed with longitudinally disposed recesses whose walls converge toward the periphery of the cutter head. In these recesses are inserted the cutting blades 22, said blades being held in position by wedge-shaped blocks 23, said blocks being forced outwardly by screws 24 whose tapered inner ends coöperate with the inclined rear edges of the blocks. The blades are adjusted in their desired position and the screws 24 are employed to force the wedges outwardly to lock the blades in place.

What I claim is:

In a fillet making machine, the combination of an adjustable V-shaped trough for supporting the fillet blank to be operated upon, a cutter head fixedly mounted to one side of the pivotal point of the trough and located above said trough for grooving the face of the blank, and a cutter head mounted so as to operate upon the rear faces of the fillet blank to increase the angularity of the relation of said rear faces to each other.

In testimony whereof I hereunto affix my signature in the presence of two witnesses, this 2nd day of June, 1911.

ANDREW F. HOWE.

Witnesses:
M. P. SMITH,
B. S. REID.